No. 628,273. Patented July 4, 1899.
J. MALLMANN.
CALCULATING MACHINE.
(Application filed Apr. 4, 1898.)
(No Model.) 6 Sheets—Sheet 1.

Witnesses. Inventor.
James Mallmann.
By Benedict & Morsell.
Attorneys

No. 628,273. Patented July 4. 1899.
J. MALLMANN.
CALCULATING MACHINE.
(Application filed Apr. 4, 1898.)
(No Model.) 6 Sheets—Sheet 2.

Witnesses.
C. N. Keeney,
A. V. Faust.

Inventor.
James Mallmann.
By Benedict & Morsell
Attorneys.

No. 628,273. Patented July 4, 1899.
J. MALLMANN.
CALCULATING MACHINE.
(Application filed Apr. 4, 1898.)
(No Model.) 6 Sheets—Sheet 4.

Witnesses.

Inventor.
James Mallmann.
By Benedict & Morsell
Attorneys.

No. 628,273. Patented July 4, 1899.
J. MALLMANN.
CALCULATING MACHINE.
(Application filed Apr. 4, 1898.)
(No Model.) 6 Sheets—Sheet 5.

Witnesses.
O. H. Keeney.
Anna V. Faust.

Inventor.
James Mallmann.
By Benedict & Morsell.
Attorneys.

No. 628,273. Patented July 4, 1899.
J. MALLMANN.
CALCULATING MACHINE.
(Application filed Apr. 4, 1898.)
(No Model.) 6 Sheets—Sheet 6.

Witnesses.
C. N. Keeney.
Anna V. Faust.

Inventor.
James Mallmann
By Benedict & Morsell,
Attorneys.

UNITED STATES PATENT OFFICE.

JAMES MALLMANN, OF SHEBOYGAN, WISCONSIN.

CALCULATING-MACHINE.

SPECIFICATION forming part of Letters Patent No. 628,273, dated July 4, 1899.

Application filed April 4, 1898. Serial No. 676,292. (No model.)

*To all whom it may concern:*

Be it known that I, JAMES MALLMANN, of Sheboygan, in the county of Sheboygan and State of Wisconsin, have invented a new and useful Improvement in Calculating-Machines, of which the following is a description, reference being had to the accompanying drawings, which are a part of this specification.

My invention has relation to improvements in calculating-machines.

The primary object had in view is to provide a calculating-machine capable of adding, subtracting, multiplying, dividing, and accomplishing other arithmetical problems within its range in a simple and expeditious manner, the machine being of an exceedingly simple construction for machines of this character, owing to the number of its working parts being reduced to the minimum, and hence capable of being manufactured and sold at a comparatively low price.

A further object contemplated is the provision of a simple type-writing attachment capable of printing the different figures in columns as the keys of different denominations are operated.

An object incidental in the printing attachment is the employment of means for throwing said printing attachment out of operative position when calculations are being made other than simple addition or subtraction.

With the above primary objects in view the invention consists of the devices and parts or their equivalents, as hereinafter more fully set forth.

Figure 1:
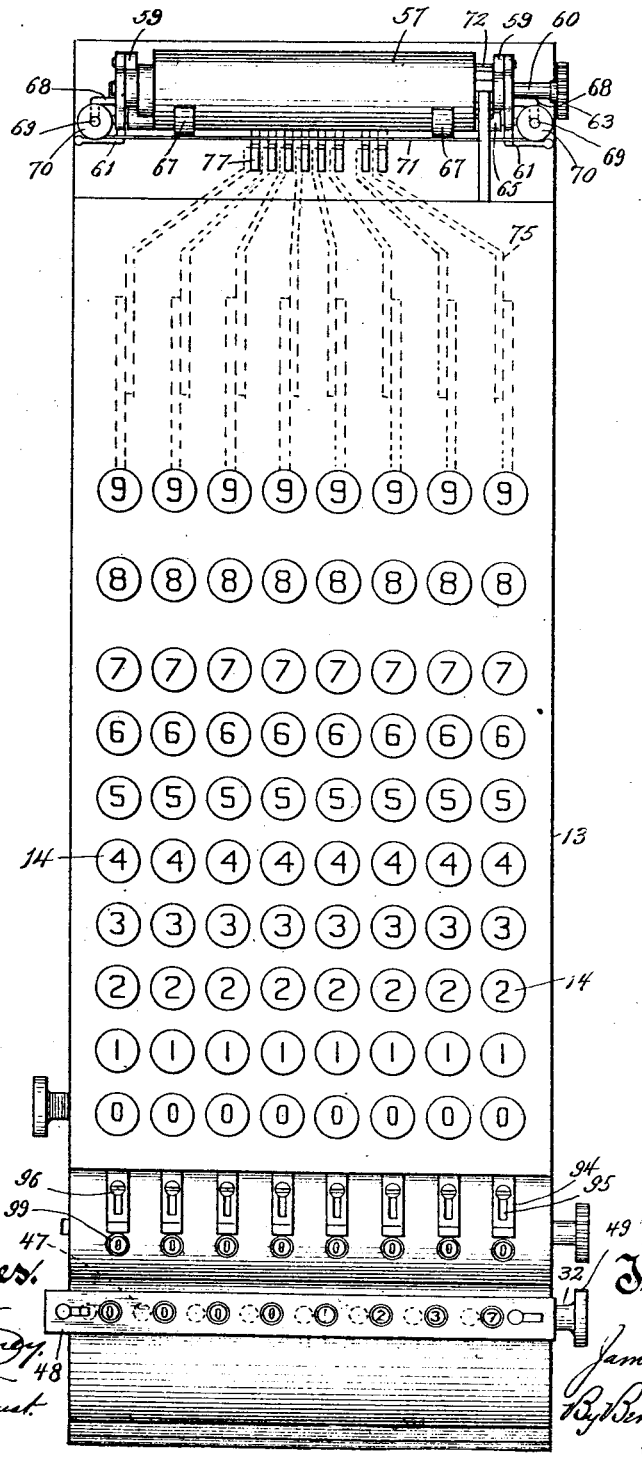
Figure 2:
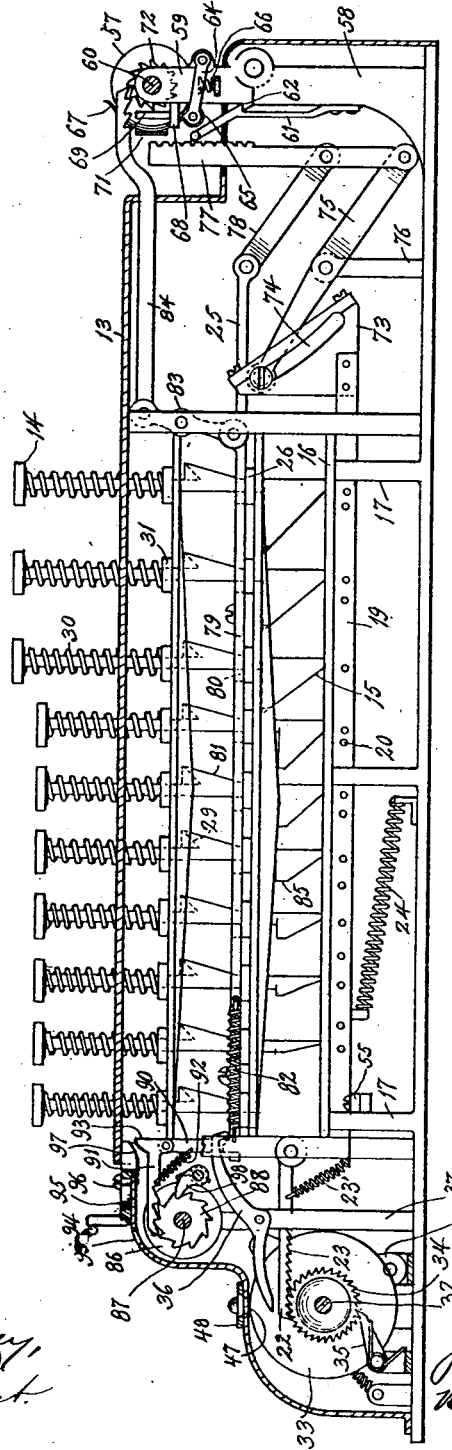
Figure 3:
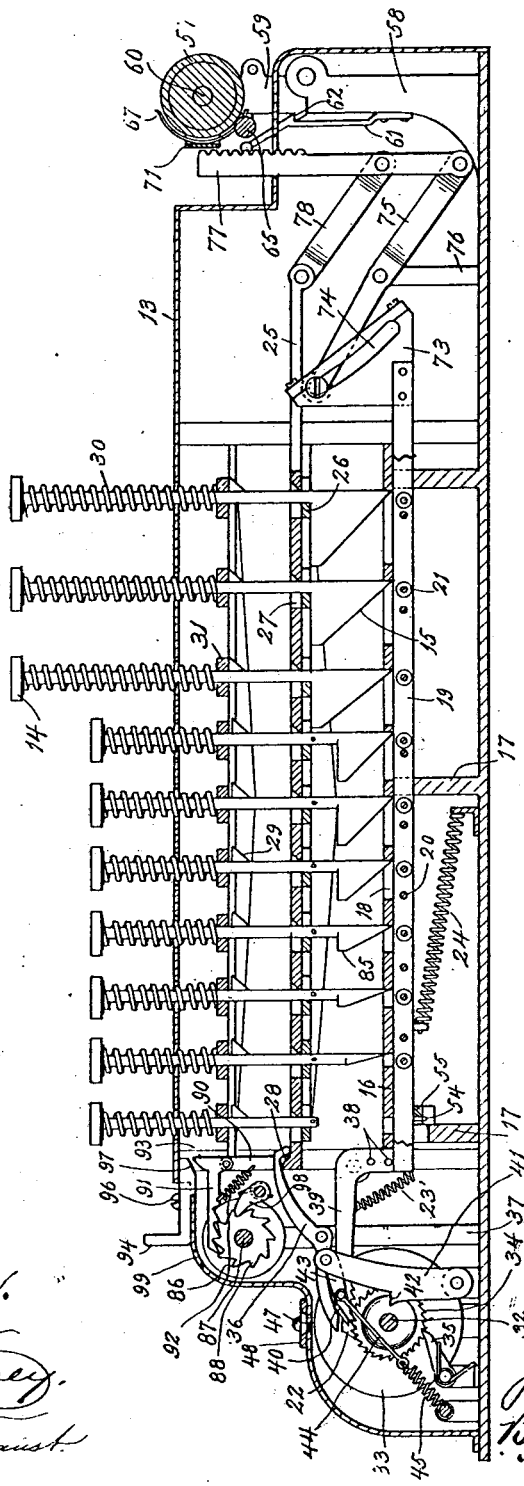
Figure 4:
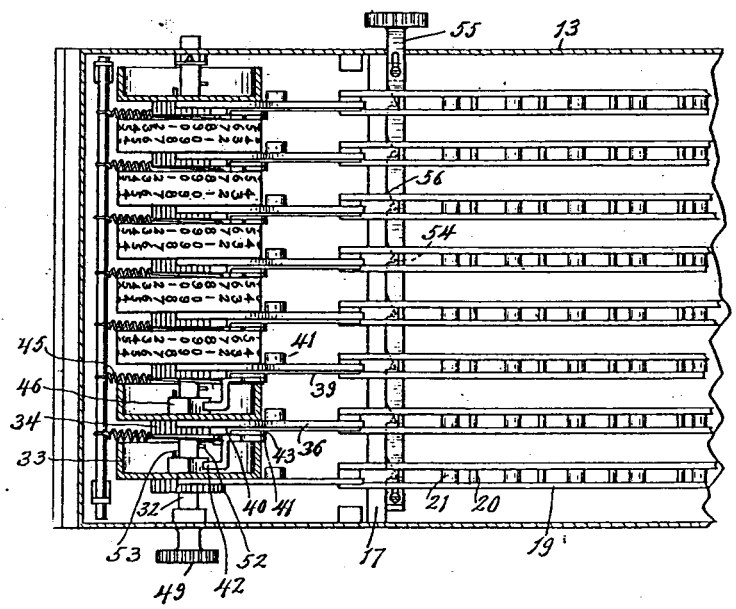
Figure 5:
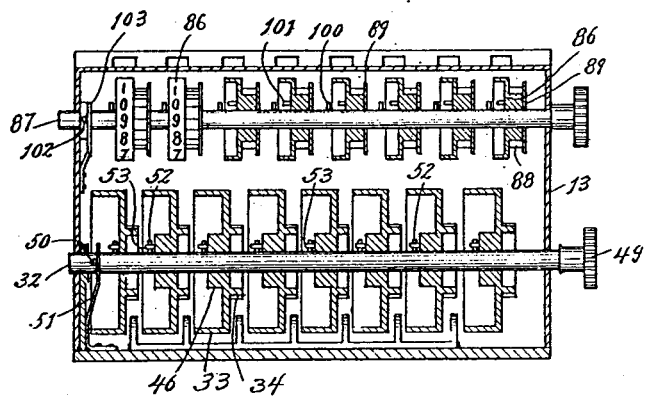
Figure 6:
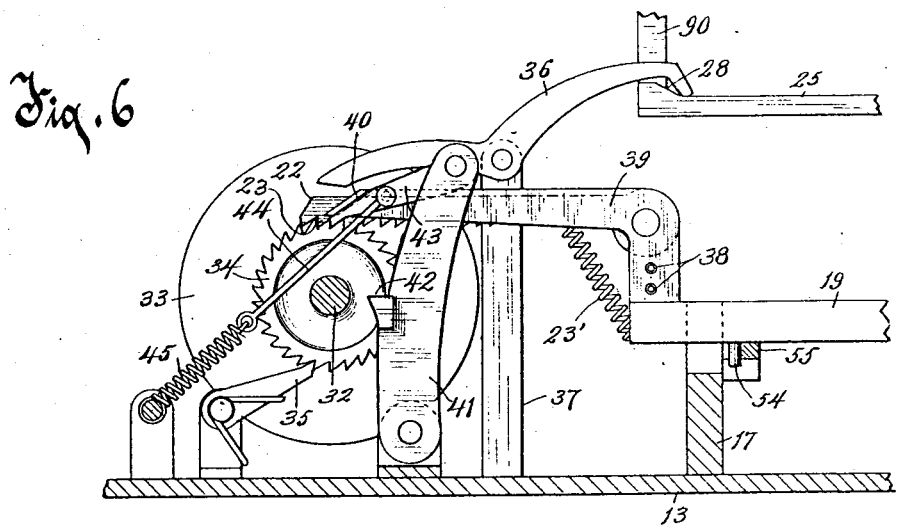
Figure 7:
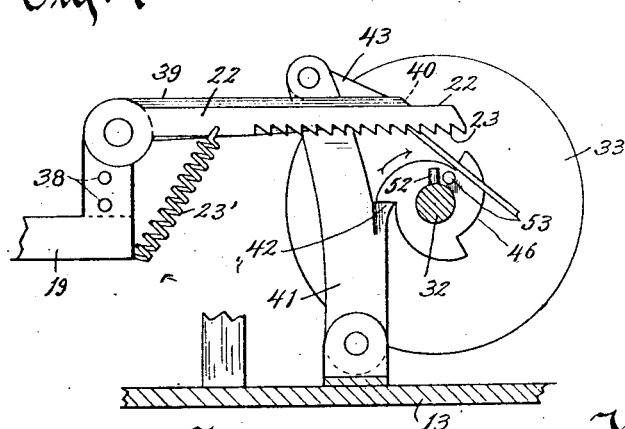
Figure 8:
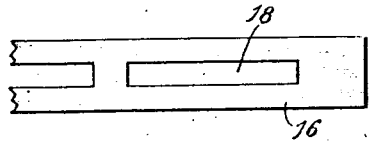
Figure 10:
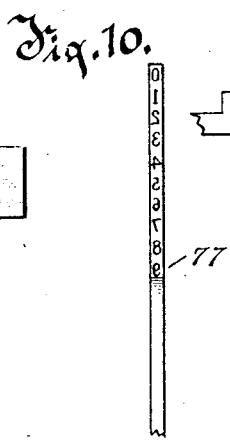
Figure 9:
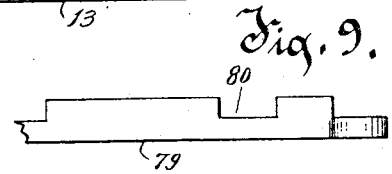
Figure 11:
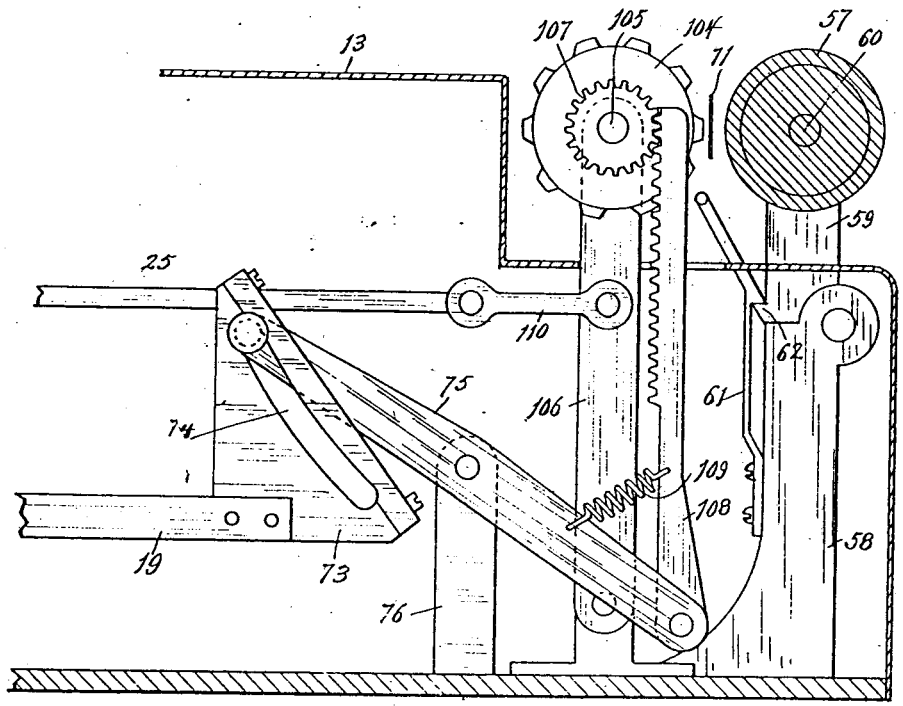
Figure 12:
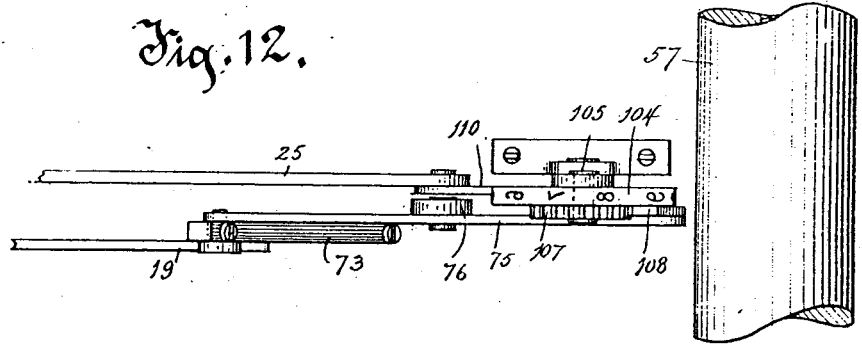

In the accompanying drawings, Figure 1 is a plan view of the complete machine. Fig. 2 is a side elevation with the side piece removed. Fig. 3 is a longitudinal section through the center of the machine. Fig. 4 is a plan view of a fragment of the machine on a plane below the quotient-wheels, parts being removed. Fig. 5 is a front elevation of the calculating and quotient wheels, parts being removed and parts in section in order to clearly disclose the means for turning said wheels back to zero. Fig. 6 is a side elevation of one of the calculating-wheels and allied parts.
Fig. 7 is a view of one of the calculating-wheels, looking on the opposite side to that shown in Fig. 6 and showing the means for carrying forward the amounts. Fig. 8 is a detail fragmentary view of one of the guide-bars. Fig. 9 is a detail fragmentary view of the push-bar which rotates the paper-carrying roll. Fig. 10 is an edge view of one of the type-bars. Fig. 11 is a side elevation of a modified form of printing device, and Fig. 12 is a plan view of Fig. 11.

Referring to the drawings, the numeral 13 indicates the casing of the machine in which most of the parts of my invention are inclosed. The top of the casing is provided with a series of lines of openings through which keys 14 pass. The upper ends of these keys are formed or provided with head-pieces or buttons on which are designated numbers. The openings are so disposed that the keys will be arranged in a series of longitudinal lines running lengthwise of the top of the casing. The heads or buttons at the upper ends of the keys of each longitudinal line are numbered from "0" to "9," the key having the "0" designation thereon being advisably the key nearest the front end of the machine and the keys of each longitudinal line being numbered consecutively from the "0" key to the key at the rear end of the machine. All the keys, with the exception of the "0" keys, are formed at their inner or lower ends with beveled edges 15, the bevel gradually increasing from the "1" key of a line to the terminal or "9" key of a line.

Above the bottom piece of the casing are arranged a series of fixed guide-bars 16, which are supported by means of transverse cross-pieces 17, extending upwardly from the bottom. One of these bars 16 is provided for each longitudinal line of keys, and said bars are so located as to be immediately in line with the lower ends of the keys of the several lines. Each bar has a series of slots 18 therethrough, which slots correspond in number to the number of keys in each line. The slots 95 of each bar are progressively lengthened from the front toward the rear of the machine, and the slots of the several bars are of the same length with respect to each other.

Below each guide-bar is a longitudinally-movable arm 19, each arm preferably consisting of two parallel bars, which are connected by a series of transverse pins 20, and said bars have journaled therebetween a series of antifriction-rollers 21, mounted on other transverse connecting-pins. These antifriction-rollers are so positioned below the slots 18 of the guide-bars that the lower ends of the beveled edges 15 of the keys will be in position to engage said rollers on the depression of a key. One of these rollers is provided for every key excepting the "0" keys. I do not wish to be understood as confining myself to this particular construction of longitudinally-movable arms, as any other desired construction may be employed which is of a character to permit the bevels of the keys to act thereon, so as to impart to said arms a longitudinal movement. The front end of each longitudinal arm is formed with an upwardly-projecting extension, to which is pivoted an arm 22, said arm provided on its under edge with a series of teeth 23, nine at least of said teeth being provided to correspond to the digits "1" to "9" of the keys. The pivoted toothed arm is held in a normal position by means of a coiled spring 23'. Each longitudinally-movable arm 19 has secured thereto one end of a coiled spring 24, said spring adapted to retrieve the arm after pressure on a key has been removed and the key returned to its normal position.

Arranged within the casing a suitable distance above the guide-bars 16 are a series of type-bar-operating arms 25, said arms being supported by suitable cross-pieces 26. One of these type-bar-operating arms is provided for each longitudinal line of keys, and each bar is provided with a series of slots 27, the rear edges of said slots being preferably beveled. The keys pass through these slots and also through registering openings in the cross-pieces 25. The forward end of each arm 25 is formed with a beveled or cam surface 28. The rear edge of each key, at a suitable distance above the type-bar-operating arms, is formed or provided with a projecting beveled lug or cam 29, which when a key is depressed is adapted to register with and engage the beveled rear edge of its slot 27, and thereby cause a rearward movement of the type-bar-operating arm. The upper portion of each key is encircled by a coiled spring 30, which is confined between the under side of the head portion or button of the key and a cross-piece 31 within the casing. These springs serve to retrieve the keys after finger-pressure thereon is removed.

Journaled in the sides of a front extension to the casing is a shaft 32, which shaft carries a series of calculating-wheels 33, there being one of said calculating-wheels employed for each longitudinal line of keys. Adjacent to and rigid with one side face of each calculating-wheel is a ratchet-wheel 34. Each of these ratchet-wheels is adapted to be engaged by the teeth of the pivoted arms 22. Each ratchet-wheel is also engaged by a spring-pressed pawl 35 to prevent backward rotation of the ratchet-wheel and calculating-wheel. In order to prevent the ratchet-wheel from rotating too far or beyond the desired point by the impetus given thereto by the engagement therewith of the teeth of the arms 22, I provide, in connection with each calculating-wheel and allied mechanism, a lever 36. Each lever is pivoted medially at the upper end of a standard 37. The end of the forward arm of each of these levers is immediately above the pivoted toothed arm 22, and the end of the rear arm of said lever is bent downwardly and bears on the edge of the arm 25 normally at the base of the cam-surface 28. By this construction after one of the longitudinally-movable arms 19 has been moved forwardly by the actuation of one of the keys and the ratchet-wheel and the calculating-wheel have been thereby rotated a certain distance the arm 25, by the manipulation of the same key, will by this time have been moved rearwardly a sufficient distance to cause the cam 28 to act on the downwardly-bent end of the lever 36, and thereby cause said lever to be turned on its pivot, so as to throw the forward arm of the lever downwardly, and thereby bring its end in firm engagement with the upper edge of the arm 22, and thus hold the teeth of said arm in firm engagement with the teeth of the ratchet-wheel, and thereby prevent more than the required rotation of said ratchet-wheel. Each calculating-wheel, with the exception of the first one of the series, has also in connection therewith mechanism for transferring amounts over from one wheel to the next wheel of the series. This mechanism will now be explained. Secured rigidly by means of bolts 38 to the upward extension of all the arms 19 with the exception of the first arm 19 of the series are arms 39, said arms provided at their outer ends with inclined lugs 40. Pivoted to lugs extending up from the bottom of the casing are bars 41, one of said bars being provided for each calculating-wheel with the exception of the initial calculating-wheel. One side of each of these bars at a medial point is provided with an outstanding lug or projection 42. To the upper end of each bar 41 is pivoted a dog 43. To the dog 43 is connected a link 44, and to the opposite end of said link is connected a coiled spring 45, said coiled spring being also connected at its other end to a fixed part. Mounted on the shaft 32, on the side of each calculating-wheel opposite to the side against which the ratchet-wheels 34 are arranged, are cam-wheels 46, said cam-wheels being each provided with a plurality of projecting cam-surfaces. The lugs 42 of the bars 41 stand out a sufficient distance laterally from the bars 41 to be engaged by the cam-surfaces of the cam-wheels 46, as shown most clearly in Fig. 7 of the drawings. This completes a description of the parts adapted for carrying over the amounts from one wheel to the other, and the operation thereof will be fully pointed out in the description of the operation of the machine in its entirety, which will follow hereinafter.

Each calculating-wheel is provided circumferentially with two series of numbers, the numbers of each series running from "0" to "9" and being duplicated three times in each circle on each wheel, so that in each circle of figures around the peripheries of the wheels thirty numbers appear. There are also thirty teeth on the ratchet-wheels 34. This arrangement, however, is not at all necessary, and if calculating-wheels of smaller diameter were used the series of numbers running from "0" to "9" might be merely duplicated in each circle, or, in fact, the numbers "0" to "9" might extend entirely around the circumference of the wheel, and in either case the number of teeth in the ratchet-wheels 34 would correspond to the number of figures on the wheel in each circle. It will be noticed that the numbers in the two circles of figures on each wheel are arranged in inverse order. The top of the forward extension of the casing is provided with a series of sight-openings 47, which register with the two series of numbers on each calculating-wheel. Above these sight-openings is a slidable plate 48, said plate also provided with a series of openings, which when the plate is shifted may be made to register with the sight-openings through which the numbers on the calculating-wheels which run in one direction are visible or in register with the openings through which the numbers on the calculating-wheels running in the reverse direction are visible.

The shaft 32 of the calculating-wheel is provided upon one end with a finger-piece 49 and near its opposite end, within the casing, is provided with a projecting pin 50, which is engaged by the free end of a spring 51. The shaft has also projecting therefrom at certain distances apart throughout its length other pins 52, and the hubs of the calculating-wheels have projecting therefrom pins 53, which are on a plane at right angles to the pins 52. The purpose of this construction is to provide for rotating the calculating-wheels back to such position that the "0" mark on all the wheels will appear through the sight-openings. In order to accomplish this, the finger-piece 49 is grasped and the shaft 32 pulled outwardly against the action of the spring 51. This will bring the shaft to such position that its pins 52 will when the shaft is rotated engage the pins 53 of the calculating-wheels. The rotation of the shaft is then continued until the wheels have been rotated the desired distance to display "0." It is obvious, however, that before the operation just described can be accomplished it is necessary that the ends of the dogs 43 be thrown out of engagement with the ratchet-wheels 34. This is accomplished by the following construction: Each of the longitudinally-movable arms 19 is formed with a depending pin 54. Passing beneath and transversely of the series of longitudinally-movable arms is an actuating-arm 55, said arm provided with a series of inclined cuts or cams 56, there being one of said inclines or cams provided for each depending pin. The actuating-bar has short elongated slots through it near opposite ends thereof, and through these slots pins pass, and thereby limit the extent of the movement of the actuating-bar in the direction of its length. Fig. 4 shows the normal position of the actuating-bar, wherein the pins 54 are adjacent to the shoulders or angles of the inclined cuts. When it is desired to turn the shaft 32 in the manner previously referred to for the purpose of turning all the calculating-wheels back to "0," the actuating-rod is first pushed inwardly to the extent of its movement. This will cause the inclined or cam surfaces thereof to act against the depending pins, and thereby move the longitudinally-movable arms forward, and consequently the pivoted toothed arms 22 and also the arm 39, in the same direction. As the arms 39 are thus moved the projecting lugs 40 thereof are moved away from the dogs 43. The actuating-arm 55 is held inwardly by one finger of one hand, while with the other hand the shaft 32 is turned in the manner previously pointed out. As the projecting lugs 40 no longer offer any obstruction to the up movement of the dogs 43, said dogs and the toothed pivoted arms 22 as the shaft 32 and the ratchet-wheels carried thereon are rotated are forced upwardly by the teeth of the ratchet-wheels, and hence said ratchet-wheels are permitted to be rotated so that "0" will appear at each sight-opening. After this is accomplished the finger pressure on the actuating-bar 55 is removed, when of course said bar is automatically returned to its normal position by means of the longitudinally-movable arms 19, which arms are moved rearwardly after having performed their function by the action of the springs 24.

Referring to the printing mechanism, the numeral 57 indicates a paper-cylinder of the usual and well-known form. Extending upwardly from the bottom of the casing are uprights 58, and to the upper ends of these uprights are hinged shorter uprights 59, which form bearings for the shaft or axis 60 of the paper-cylinder. The short standards are so hinged as to be thrown rearwardly when released, so that the paper-cylinder may be turned out of operative position for printing. The short uprights are held releasably in upright position by any desired means—such, for instance, as by spring-arms 61, which arms are provided with projecting shoulders, said shoulders adapted to engage other shoulders 62 at the lower ends of the uprights. These spring-arms are preferably provided with inclined or oblique extensions, forming handles for convenience in operating the same when it is desired to throw the shoulders thereof out of engagement with the shoulders of the short uprights. One end of the shaft or axis of the paper-cylinder is extended a desired distance beyond the side of the casing and is provided with a milled head 63 for convenience in turning the shaft and its cylinder in order to properly adjust the paper to be printed onto the cylinder. Pivoted to the uprights 59 are short arms 64, the front ends of said arms being extended beyond the edges of the uprights. Journaled between these arms is a roller 65, the trunnions of said roller projecting into the ends of the arms. The under edge of each short arm has bearing thereagainst a spring 66, which causes the forward ends of the arms to be thrown upwardly in order to bring the roller yieldingly in contact with the surface of the paper-cylinder, whereby the paper when adjusted to said cylinder is held firmly to the surface thereof, so that when the cylinder is rotated the paper is moved therewith. Each arm 64 is also formed or provided with curved fingers 67, adjacent to the surface of the cylinder, and forming guides for guiding the paper around the cylinder as said cylinder is rotated.

The numerals 68 68 indicate laterally-extending angular arms, which at their ends are provided with upwardly-extending spindles 69 69, on which are revolubly mounted rolls 70 70. A printing-ribbon 71 extends from one roll 70 to the other and is adapted to be unwound from one roll and wound up on the other. This ribbon extends lengthwise of the cylinder and adjacent to the surface of said cylinder against which the type-bars strike. Mounted on the shaft or axis of the paper-cylinder, near one end of said shaft or axis, is a ratchet-wheel 72.

Each longitudinally-movable arm 19 has connected to its rear end a plate 73, provided with a curved slot 74. The numerals 75 indicate a series of rocking levers, one being provided for each plate 73. These levers are pivoted medially to the upper ends of uprights 76. A screw or pin passes through the curved slot of each plate 73 and engages the forward end of each rocking lever. To the rear end of each rocking lever is connected the lower end of a type-bar 77, there being one of said type-bars for each longitudinally-movable arm and being actuated by each of said longitudinally-movable arms in the manner just described. Each type-bar is provided at its upper end, upon its rear edge, with a series of characters, the characters in the present application of the device being the numbers "0" to "9," "0" starting at the upper end of the bar and the other numbers following downwardly in regular sequence.

To the rear end of the type-bar-operating arms are connected links 78, the opposite ends of said links being connected to the type-bars, and said links forming with the rocking levers 75 a series of parallelograms.

Arranged along one side of and within the casing and parallel with the first line of keys is a push-bar 79, said bar being provided along one edge at distances apart corresponding to the distance between the keys with a series of recesses 80. The operating-keys 14 have also projecting from their rear edges beveled surfaces 81, which when the keys are depressed are adapted to engage the recesses of the push-bars. It will of course be understood that only the keys in one line are provided with these registering beveled lugs 81, inasmuch as only one push-bar 79 is provided. The forward end of the push-bar is connected to one end of a coiled spring 82. The rear end of the push-bar is connected to the lower end of a medially-pivoted lever 83. The upper end of this medially-pivoted lever has pivoted thereto an arm 84. The forward end of this arm is provided with a series of teeth which are adapted to engage the ratchet-wheel 72.

The operation of my machine for the purpose of adding numbers will now be explained. Before operating the plate 48 should be slid toward the right of Fig. 1, so as to bring its sight-openings into register with those sight-openings 47 of the casing through which the first circle of numbers on the calculating-wheels are visible. If the wheels are not turned so as to make "0" on each one visible, the shaft 32 should be turned in the manner hereinbefore pointed out until each wheel is in position to bring its "0" character to view. Now it will be supposed that it is desired to add the following numbers: "614," "25," and "1,890." In the first place key 6 of the third column is depressed. The beveled surface 15 of this key will pass through the appropriate slot of its guide-bar 16 and then act on the antifriction-roller 21 below of the appropriate longitudinally-movable arm 19. It will be understood that the beveled surface 15 of each key is so proportioned that it will move its longitudinally-movable bar just the required distance to cause the pivoted toothed arm 22 to turn the ratchet-wheel 34 a sufficient distance to cause the appropriate calculating-wheel to turn just the proper distance to disclose the number indicated on the particular key, in this instance the number "6." It will be noticed that the upper end of each bevel 15 terminates in an abrupt straight shoulder 85. Just before a key completes its full down movement, therefore, this abrupt shoulder enters the slot of the guide-bar 16, and hence there is no further forward movement of the longitudinally-movable bar. At this time the small beveled lug 29 at a medial point of the key comes into action and enters the slot 27 of the type-bar-operating arm 25, and hence forces said arm toward the rear of the machine. This will cause the cam-surface 28 of said arm to act on the lever 36 in the manner hereinbefore pointed out, so as to cause the forward end of said lever to bear on the pivoted toothed arm 22, and thereby prevent the ratchet-wheel 34 from rotating beyond the desired point. The next operation in the example given is to depress key 1 of the second column and then key 4 of the first column. In each instance the same operation of parts occurs, as just described, and the wheels will show "614." The next operation is to depress key 2 of second column.

This will cause the calculating-wheel of this column to move the distance of two more numbers, and as the number "1" was before visible through the sight-openings the number "3" of this calculating-wheel will now be visible. Next key 5 of the first column is depressed. As the calculating-wheel of said first column was left before at "4," said wheel will now move the distance of five more teeth and display "9" to view. Next key 1 of fourth column is depressed. This will display the number "1" of the calculating-wheel relating to fourth column. Next key 8 of third column is depressed. As the calculating-wheel of the third column before disclosed "6" the wheel will be rotated such a distance as to pass by the number "9" of this series or numbers of the circle and be brought to "4" of the succeeding series of numbers of the circle, and thereby disclose "4" to view. In thus passing by the first series of numbers, however, and in leaving the number "9" of said first series the cam-wheel 46 relating to this calculating-wheel will have been rotated sufficiently far to bring the highest point of the cam-surface against the projecting lug of the bar 41, and hence turn said bar on its pivot and drawing back the dog 43. With the continued rotation of the calculating-wheel and the cam-wheel, and as the number "9" of this series of numbers of the circle leaves the sight-opening, the highest point of the cam-surface leaves the projecting lug of the bar 41, and said projecting lug falls into engagement with the lowest point of the next cam-surface, thus permitting the bar 41 to return to its normal position, and in so returning to cause the dog 43 thereof to engage with the ratchet-wheel 34 of the next succeeding calculating-wheel, or the calculating-wheel of the fourth column, turning said wheel the distance of one number. The inclined lug 40 prevents overrotation of this succeeding ratchet-wheel, inasmuch as the end of the pawl on its forward thrust comes beneath this lug, and hence said lug holds the pawl firmly in engagement with the teeth of the ratchet-wheel, thereby preventing overrotation of said ratchet-wheel by its own momentum. Inasmuch as the number "1" was previously to view in said fourth column, number "2" will now be brought to view through the sight-openings. The next operation is to depress key 9 of the second column. As the number "3" was before visible in said second column the calculating-wheel pertaining thereto will pass by the number "9" of this particular series of numbers on the wheel and disclose figure "2" of the next series of this circle of numbers, and in passing by the "9" the next succeeding calculating-wheel, or the calculating-wheel of the third column will be operated the distance of one number in exactly the same manner as previously pointed out. As the calculating-wheel for said third column previously disclosed "4" it will now disclose "5." The wheels will therefore show through the sight-openings the number "2,539," which is the sum total of the three numbers added together.

When my machine is thus used for the operation of adding, it at the same time simultaneously prints the numbers in columns. As the keys are depressed in the manner just described and the longitudinally-movable arms 19 are forced forwardly, the movement of the plate 73, carried at the rear end of each longitudinally-movable arm, will cause the pin in the end of the rocking lever 75 to ride in the curved slot 74, and thus turn said rocking lever and elevate the type-bar 77. When each key has been depressed to such an extent as to bring the square shoulder 85 thereof into engagement with the appropriate slot of the guide-bar 16 and the forward movement of the longitudinally-movable arm 19 is thus stopped, the beveled lug 29 will then be acting against the inclined rear bordering edge of the appropriate slot 27 in the type-bar-operating arm 25, and thereby cause a rearward movement of said type-bar-operating arm, and consequently such action against the link 78 as to cause the type-bar to be thrown rearwardly, so as to cause the appropriate type to strike against the inking-ribbon 71 and force said inking-ribbon against the paper to be printed upon. It will be understood that the keys are so regulated that the longitudinal movement of the arms 19 is just sufficient to cause the raising of the type-bar such a height as to bring the proper type into such position with relation to the paper-cylinder as to print the particular number represented by the key onto the paper. In the example previously given it will be obvious that "614" will be first printed, and immediately upon depressing the last key 4, which is a key of the first column, the beveled surface 81 of said key will act on the push-bar 79, so as to cause a turning of the medially-pivoted lever 83 and a pulling forward of the toothed arm 84. When pressure on the key is removed, the coiled spring 82 will return the push-bar 79 to its normal position, and in thus turning the same cause the toothed arm 84 to be thrown rearwardly, the teeth of said arm engaging the ratchet-wheel 72, and thereby moving the paper-cylinder 57 the required distance rotatively to bring the paper in position for the next line of figures. After the different numbers are thus printed in a column the sum total is shown on the registering-wheels, and this total amount may be kept in the mind of the operator or set down on a piece of paper and then the keys operated to print the total amount beneath the column of figures. When the machine is used for the purpose of subtracting, the very same operation of the printing mechanism takes place as in the case of adding—that is to say, the printing mechanism first prints the number to be subtracted from and then beneath said number the number to be subtracted. The remainder is printed in the same manner as explained in regard to printing the total in the operation of addition. This printing mechanism is not adapted for the operations of multiplying and dividing, as will be readily understood from the explanation of these operations, and hence when the machine is employed for such purposes the printing mechanism is thrown out of operative position by pulling the spring-arm 61 out of engagement with the shoulders 62 of the short uprights 59. Said uprights are then free to be thrown rearwardly on their hinges and to carry the paper-cylinder and allied parts in the same direction.

The operation of multiplying will now be explained. In this operation the same sight-openings and the same circles of figures on the calculating-wheels are employed as in the operation of adding, all the calculating-wheels, in the first place, being set to "0." It will be supposed that it is desired to multiply "82" by "12." It is necessary to first press key 2 of the first column twice, then key 8 of second column twice, then key 2 of second column once, and key 8 of third column once. The result will be "984," which will be disclosed through the registering sight-openings. The carrying over from one calculating-wheel to the other is accomplished exactly in the same manner as in the operation of adding.

In subtracting the sliding plate 48 is slid to the left of Fig. 1, so as to bring the sight-openings thereof into register with the sight-openings of the casing which are immediately above the left-hand circle of numbers around the calculating-wheel or the circles of numbers which run in inverse direction, and which numbers will be designated as the "negative" numbers. It will be supposed that if it is desired to subtract "167,002" from "623,914" the operation is as follows: First set the number to be subtracted from—in this example "623,914." Next depress key 1 of sixth column, key 6 of fifth column, key 7 of fourth column, and key 2 of first column. The result is "456,912."

In subtracting, when the rotation is carried over from one calculating-wheel to the other instead of the succeeding calculating-wheel disclosing one number greater it discloses one number less, in view of the inverse arrangement of the negative numbers.

In the operation of dividing it is necessary to employ an extra series of wheels for displaying the quotient, and which wheels I herein designate as "quotient-wheels" and indicate the same by the numerals 86. These wheels are arranged in a portion of the casing above the lower calculating-wheels and are mounted on a shaft 87. Each wheel has a series of numbers around its periphery running from "0" to "9." Rigid with each quotient-wheel is a ratchet-wheel 88, and rigid with each ratchet-wheel is a disk 89. The front end of each type-bar-operating arm 25 is provided with an upwardly-extending arm 90, and to the upper extremity of each arm 90 is pivoted a pawl 91, the teeth of one of said pawls being in engagement with each ratchet-wheel 88. One end of a coiled spring 92 is connected to the pawl and the opposite end of said spring to the arm 90. The inner end of each pawl is formed with an upwardly-extending beveled lug 93. On the top of the casing, above the quotient-wheels, are a series of angle-arms 94, which arms are provided with elongated slots 95, through which set-screws 96 pass. The inner ends of these arms extend through openings into the casing and are provided with beveled surfaces 97, which surfaces are immediately above the beveled lugs 93 of the pawls 91. A spring-pressed dog 98 engages the ratchet-wheels 88 and prevents backward rotation of said wheels. In the operation of the quotient-wheels when it is desired that any one or more of said wheels should rotate the angle-arms 94 are pulled outwardly, and when a key is depressed the beveled lug 29 of said key will act on the type-bar-operating arm 25 and cause the arm 90 and the pawl carried thereby to be moved forwardly, and thus rotate the ratchet-wheel the desired distance to display the number on the quotient-wheel corresponding to the key depressed, which number is visible through the sight-openings 99. When, however, it is desired that any one or more of the quotient-wheels should not be rotated, the angle-arm is pushed inwardly, so as to cause the beveled surface 97 thereof to engage the beveled lug 93 of the pawl, and thus raise the teeth of said pawl out of engagement with the teeth of the ratchet-wheel. It is therefore obvious that when the bar 25 is pushed forwardly the particular quotient-wheel will not be rotated.

In explanation of dividing numbers it will be supposed that it is desired to divide the number "841" by "65." The quotient-wheels are first set so that none of said wheels will be operated. The dividend is then displayed through the negative openings of the calculating-wheels or the numbers of the left-hand circle of numbers on the calculating-wheel. The divisor being "65," it is first requisite to divide this number into the first numbers of the dividend which will contain it, said numbers being "84." "65," the divisor, is therefore struck once by pressing key 5 of the second column and key 6 of the third column. Before doing this, however, the quotient-wheel of the second column is made capable of rotating by pulling out the angle-arm 94 pertaining thereto, so that the teeth of the pawl 91 will be in engagement with the ratchet-wheel. The operation thus far will show the figure "1" in the quotient place of the second column. Now pull out the angle-arm pertaining to the quotient-wheel of the first column, so that said quotient-wheel may be operated, and strike the divisor "65" by pressing key 5 of first column and key 6 of second column, repeating as often until the negative openings of the calculating-wheels show a lesser number than the divisor. In this example, therefore, the key 5 of first column and key 6 of second column will be struck twice, inasmuch as after striking said keys twice the negative openings will show "61" as the remainder, which of course is less than the divisor. The quotient-wheel of the first column will also show "2," owing to key 5 of said first column having been depressed twice. The quotient will therefore be "12," with a remainder of "61," making the answer "12 61/83." The quotient-wheels are also provided with means for turning them back to "0," similar to the means employed for turning the calculating-wheel, and consisting of pins 100, extending from the shaft 87, and pins 101 at right angles thereto, extending from the quotient-wheels. At one end the shaft is provided with a milled head for convenience in pulling the same outwardly, and near its opposite end, within the casing, is provided with a projecting pin 102, against which bears a spring-arm 103.

On Sheet 6 of the drawings I show a modified form of printing arrangement. The paper-cylinder 57 is mounted in the same manner as in the other form of construction, and I also employ the rocking lever 75 and the plates 73 at the ends of the longitudinally-movable arms 19. Instead, however, of arranging the type on a type-bar I arrange said type on a wheel 104, mounted on a short shaft 105, carried at the upper end of a pivoted bearing 106. On the same shaft is mounted and fast to the type-wheel a gear-wheel 107. To the rear end of the rocking lever 75 is connected the lower end of a rack-bar 108, the teeth of which are adapted to engage with the gear-wheel 107. A coiled spring 109 has one end connected to the rack-bar and its other end connected to the rocking lever 75. Each arm 25 is connected to the pivoted bearing 106 by means of a link 110. In operation of this form of type-writing attachment when a key is depressed and the beveled portion 15 thereof acts upon the longitudinally-movable arm 10 and moves said arm forwardly the rocking lever 75, through its connection with the slot 74 of the plate 73, is caused to turn on its pivot and move the rack-bar upwardly the requisite distance to rotate the gear-wheel 107 the proper distance to bring the number on the type-wheel which corresponds to the number designating the key in proper position for printing on the paper carried by the printing-cylinder 57. When the number is thus brought around to position, the beveled lug 29 will act on the arm 25 and cause the pivoted bearing 106 to be swung rearwardly on its pivot and force the type against the inking-ribbon and cause the imprint to be made on the paper around the cylinder. The rack-bar 108 is also necessarily carried rearward against the action of the coiled spring 109, and after pressure on the key is removed and said key returns to its normal position, so as to release the beveled lug 29 from engagement with the slot of arm 25, the recoil of spring 109 will return the rack-bar 108 to its normal position, and said rack-bar in turn will force the pivoted bearing 106 and the type-wheel and other parts carried thereby back to their normal upright position. It will of course be understood that for each line of keys one of the type-wheels and allied mechanism is provided, each type-wheel being mounted on a separate short shaft.

I claim—

1. The combination, of a series of lines of keys, said keys provided with bevels, the bevel of each successive key being greater than the bevel of the preceding key, a fixed guide-bar for each line of keys, each of said bars provided with a series of slots in line with the keys, and each successive slot being longer than the preceding slot, the slots adapted to accommodate the bevels of the keys, a longitudinal arm for each line of keys, and adapted to be acted upon by the bevels of the keys, as said keys are depressed and forced through the slots of the guide-bars, each arm adapted to be thereby moved varying distances by each key of a line as a key is depressed, and registering mechanism adapted to be actuated by each longitudinal arm as said arm is acted upon by the keys, the different keys causing different registrations of the registering mechanism.

2. The combination, of a series of lines of keys, said keys provided with bevels, the bevel of each successive key being greater than the bevel of the preceding key, a fixed guide-bar for each line of keys, each of said bars provided with a series of slots in line with the keys, and each successive slot being longer than the preceding slot, the slots adapted to accommodate the bevels of the keys, a longitudinal arm for each line of keys, each of said arms consisting of two parallel bars having antifriction-rollers journaled therebetween, said rollers adapted to be acted upon by the bevels of the keys, as said keys are depressed and forced through the slots of the guide-bars, each arm adapted to be thereby moved varying distances for each key of a line as a key is depressed, and registering mechanism adapted to be actuated by each longitudinal arm as said arm is acted upon by the keys, the different keys causing different registrations of the registering mechanism.

3. The combination, of a series of longitudinal arms, means for actuating the same varying distances, registering mechanism consisting of a series of index-wheels, a ratchet-wheel fast to each index-wheel, a toothed bar pivoted to each longitudinal arm and in engagement with the teeth of the ratchet-wheel, whereby the actuation of each longitudinal arm will cause, through the movement of the toothed bar, a certain rotation of the ratchet-wheel and the index-wheel therewith, a pivoted lever, and means for turning said lever so as to throw its end into engagement with the toothed bar at the instant said toothed bar moves the ratchet-wheel the required distance, whereby said ratchet-wheel is prevented from being rotated beyond the proper point.

4. The combination, of a series of longitudinal arms, means for actuating the same varying distances, registering mechanism consisting of a series of index-wheels, a ratchet-wheel fast on each index-wheel, a toothed bar pivoted to each longitudinal arm and engaging the teeth of the ratchet-wheel, whereby the actuation of each longitudinal arm will cause, through the movement of the toothed bar, a certain rotation of the ratchet-wheel and the index-wheel therewith, a medially-pivoted lever, a bar provided with an incline or cam, and means for moving said bar longitudinally whereby the cam is adapted to act on one end of the lever in order to throw its opposite end into engagement with the toothed bar, at the instant said toothed bar moves the ratchet-wheel the required distance, whereby said ratchet-wheel is prevented from being overrotated beyond the proper point.

5. In a calculating-machine, the combination, of a series of lines of keys, a bar for each line of keys, and adapted to be actuated as each key is depressed, each of said bars provided with an incline or cam surface, a longitudinal arm for each line of keys, each arm constructed to be actuated varying distances for each key of a line, registering mechanism consisting of a series of index-wheels, a ratchet-wheel fast to each index-wheel, a toothed bar pivoted to each longitudinal arm, and having its teeth in engagement with the teeth of the ratchet-wheel, whereby the actuation of each longitudinal arm will cause, through the movement of the toothed bar, a certain rotation of the ratchet-wheel and the index-wheel therewith, and a medially-pivoted lever, one end thereof adapted to be acted upon by the incline or cam of each longitudinally-actuated bar, and when so acted upon, to throw the opposite end of the lever into engagement with the toothed bar at the instant said toothed bar moves the ratchet-wheel the required distance, whereby said ratchet-wheel is prevented from being rotated beyond the proper point.

6. The combination, of registering mechanism consisting of a series of index-wheels, a ratchet-wheel rotatable with each index-wheel, a cam-wheel rotatable with each index-wheel, a pivoted bar, provided with a projecting lug adapted to ride along the cam-surface, and said bar adapted to be turned on its pivot when the projecting lug thereof reaches the highest point of the cam, and to rock in the opposite direction, when the lug leaves the highest point of said cam, a pawl pivoted to the upper end of the pivoted bar, and adapted to engage the ratchet-wheel of the succeeding index-wheel, when the lug of the pivoted bar leaves the highest point of the cam-surface, and thereby rotate said succeeding ratchet-wheel a certain distance, in order to impart to the successive index-wheel a rotation equal to the distance of the number, whereby, after the first index-wheel has rotated a certain distance a partial rotation will be transferred to the succeeding wheel.

7. The combination, of registering mechanism consisting of index-wheels, and a ratchet-wheel and cam-wheel for each index-wheel, and located, respectively, upon opposite sides of each index-wheel, a series of longitudinally-movable arms, each arm formed or provided with an extension, said extension provided with a lug, a toothed bar pivoted to each longitudinal arm and adapted to engage each ratchet-wheel, a pivoted bar provided with a projecting lug adapted to engage the cam-wheel, a pawl pivoted to said bar, the action of the cam-surface of the cam-wheel on the lug of the pivoted bar causing the pawl carried by said bar to be moved the distance permitted by the lug of the extension of the longitudinal arm, and thereby move the succeeding ratchet-wheel the distance necessary to rotate the succeeding index-wheel the distance of one character, said lug of the extension of the longitudinal arm thereby preventing over-rotation of the succeeding ratchet-wheel by holding the pawl firmly in engagement with the teeth of the ratchet-wheel.

8. The combination, of a series of bars provided each with a depending pin, and each having an extension therefrom, said extension formed with a lug, a pivoted toothed bar, a shaft having lateral play, and having a series of pins radiating therefrom, index-wheels mounted on the shaft and having pins extending therefrom at right angles to the pins of the shaft, ratchet-wheels mounted on the same shaft with the index-wheels, said ratchet-wheels being engaged by the pivoted toothed arms, a cam-wheel for each index-wheel, a pivoted arm provided with a lug adapted to engage the cam-wheel, a pawl carried by the pivoted arm and adapted to engage the lug of the extension of the longitudinal arm, whereby the pawl is prevented from overrotating the succeeding ratchet-wheel, and an operating-bar provided with a series of cam-surfaces adapted to engage the pins of the longitudinal arms, as said bar is operated, whereby the longitudinal arms are moved longitudinally in order to bring the lugs of the extensions of the arms out of engagement with the pawls, whereby on the outpulling of the shaft said shaft can be turned so as to bring its pins into engagement with the pins of the index-wheels, and thereby rotate said index-wheels to a common point.

9. In a calculating-machine, the combination, of a series of index-wheels each having two sets or series of numbers, one set or series running in a reverse direction to the other, means for actuating said wheels, a quotient-wheel for each index-wheel, and means for throwing each quotient-wheel into or out of operation, so as to be operated each time an index-wheel is operated.

10. In a calculating-machine, the combination, of a series of index-wheels each having two sets or series of numbers, one set or series running in reverse direction to the other, means for actuating said wheels, a series of quotient-wheels, one quotient-wheel being provided for each index-wheel, a ratchet-wheel for each quotient-wheel, a pivoted pawl for each quotient-wheel, each pawl formed or provided with a lug, and a movable arm adapted to engage the lug so as to turn the pawl on its pivot, and thereby throw the same out of engagement with the ratchet-wheel.

11. In a calculating-machine, the combination, of a series of lines of keys, a bar for each line of keys, and constructed to be actuated varying distances by each key of a line, calculating mechanism for each line of keys and operated by the bar for said line of keys, each mechanism operating an index-wheel, a type-writing attachment, a rocking lever for each longitudinally-movable arm and having one end working in a curved slot formed in a plate extending from each longitudinal arm, and the opposite end of each rocking lever connected to the type-writing attachment so as to bring the proper type or character to printing position, and means for forcing said type or character against the paper to be printed upon.

12. In a calculating-machine, the combination, of a series of keys, registering mechanism adapted to be actuated thereby as each key is depressed, standards projecting upwardly from the base of the machine, other standards hinged to the first-named standards, and normally held in upright position with relation thereto, a paper-cylinder journaled in the last-mentioned standards, means for detachably holding said last-named standards in upright position, and for releasing said standards so as to adapt said standards and the cylinder carried thereby to be thrown out of printing position, a series of parts carrying characters, and a connection between said parts and the calculating-machine, whereby as each key is depressed, the proper type is brought to printing position, and caused to make an imprint upon the paper.

13. In a calculating-machine, the combination, of a series of lines of keys, longitudinal arms adapted to be actuated thereby, each arm provided at one end with a projecting plate having a segmental slot therein, and said arms adapted to be moved varying distances as each key is depressed, registering mechanism operated by the longitudinal arms, a paper-cylinder journaled in suitable bearings, a series of type-bars for each longitudinal line of keys, a series of rocking levers, each having one end connected to the end of the type-bar, and its opposite end working in a curved slot of the upwardly-projecting plate, a push-bar also adapted to be operated as each key is depressed, and a link connecting each push-bar with each type-bar.

14. In a calculating-machine, the combination, of a series of keys, registering mechanism adapted to be actuated as each key is depressed, a rod adapted to be moved longitudinally as each key is depressed, a coiled spring connected at one end to one end of the rod, and at its other end to a fixed point, a medially-pivoted lever having one end connected to the rod, a toothed bar or pawl connected to the opposite end of the medially-pivoted lever, a paper-cylinder mounted in suitable bearings, a ratchet-wheel mounted on the axis of the paper-cylinder, and adapted through the described connection to move the paper-cylinder a certain distance upon each depression of a key, a series of type, and means for bringing the proper type to printing position and into engagement with the paper-cylinder upon each depression of a key.

In testimony whereof I affix my signature in presence of two witnesses.

JAMES MALLMANN.

Witnesses:
ARTHUR L. MORSELL,
ANNA V. FAUST.